US009007710B1

(12) United States Patent
Liu et al.

(10) Patent No.: US 9,007,710 B1
(45) Date of Patent: Apr. 14, 2015

(54) REWRITE OPERATION FOR RECORDING BANDS

(71) Applicant: Seagate Technology LLC, Cupertino, CA (US)

(72) Inventors: Xiong Liu, Singapore (SG); Brian T Edgar, Minneapolis, MN (US); Feng Shen, Singapore (SG); WenXiang Xie, Singapore (SG); ThanZaw Thein, Singapore (SG)

(73) Assignee: Seagate Technology, Cupertino, CA (US)

( * ) Notice: Subject to any disclaimer, the term of this patent is extended or adjusted under 35 U.S.C. 154(b) by 0 days.

(21) Appl. No.: 14/470,340

(22) Filed: Aug. 27, 2014

(51) Int. Cl.
G11B 5/09 (2006.01)
G11B 20/12 (2006.01)
G11B 20/10 (2006.01)

(52) U.S. Cl.
CPC .... G11B 20/1217 (2013.01); *G11B 2020/1238* (2013.01); *G11B 2020/10907* (2013.01)

(58) Field of Classification Search
None
See application file for complete search history.

(56) References Cited

U.S. PATENT DOCUMENTS

| | | | |
|---|---|---|---|
| 6,198,708 B1 | 3/2001 | Suzuki | |
| 6,532,121 B1 * | 3/2003 | Rust et al. | 360/8 |
| 6,598,135 B1 | 7/2003 | MacLeod | |
| 6,904,495 B2 | 6/2005 | Frantz et al. | |
| 6,967,810 B2 | 11/2005 | Kasiraj et al. | |
| 7,193,803 B2 | 3/2007 | Jaquette | |
| 7,257,732 B2 | 8/2007 | Zarnke et al. | |
| 7,490,212 B2 | 2/2009 | Kasiraj et al. | |
| 7,673,096 B2 | 3/2010 | Aoyama | |
| 7,689,860 B2 | 3/2010 | Zarnke et al. | |
| 7,965,465 B2 | 6/2011 | Sanvido et al. | |
| 7,996,645 B2 | 8/2011 | New et al. | |
| 8,040,628 B2 | 10/2011 | Tang | |
| 8,054,572 B2 | 11/2011 | Brume et al. | |
| 8,068,303 B2 | 11/2011 | Jaquette | |
| 8,108,602 B2 | 1/2012 | New et al. | |
| 8,116,021 B2 | 2/2012 | Alex et al. | |
| 8,161,319 B2 | 4/2012 | Zarnke et al. | |
| 8,179,627 B2 | 5/2012 | Chang et al. | |
| 8,270,256 B1 | 9/2012 | Juang et al. | |
| 8,275,970 B2 | 9/2012 | Bolosky | |
| 8,375,177 B2 | 2/2013 | Gill et al. | |
| 8,385,162 B2 | 2/2013 | Rosen et al. | |
| 8,432,632 B2 | 4/2013 | Benhase et al. | |
| 8,432,633 B2 | 4/2013 | Grobis et al. | |
| 8,537,481 B1 | 9/2013 | Bandic et al. | |
| 8,559,121 B2 | 10/2013 | Saito et al. | |
| 8,587,890 B2 | 11/2013 | Bui et al. | |

(Continued)

*Primary Examiner* — Peter Vincent Agustin
(74) *Attorney, Agent, or Firm* — Cesari & Reed LLP; Kirk A. Cesari; Christian W. Best

(57) ABSTRACT

Systems and methods are disclosed for performing a rewrite operation on recording bands of a data storage medium. In some embodiments, data may be read from a target band including a plurality of tracks, and modified. A portion less than all of the modified data is stored to a nonvolatile memory, and all of the modified data is written to the target band. In some embodiments, modified data corresponding to the first two tracks of the target band is stored to the nonvolatile memory, and modified data corresponding to the third track of the target band is written back to the first physical track. Each track may be written in order, ending with the modified data corresponding to the first two tracks. The result may be that data for each track in the band has shifted up two tracks, with data for the first two tracks moved to the end.

20 Claims, 13 Drawing Sheets

(56) References Cited

U.S. PATENT DOCUMENTS

| | | |
|---|---|---|
| 8,593,748 B1 * | 11/2013 | Bandic et al. .................. 360/31 |
| 8,665,545 B2 | 3/2014 | Coker et al. |
| 8,682,501 B2 * | 3/2014 | Hosotani ........................ 701/1 |
| 8,699,159 B1 | 4/2014 | Malina |
| 8,699,162 B1 * | 4/2014 | Grobis et al. .................. 360/48 |
| 8,699,185 B1 | 4/2014 | Teh et al. |
| 8,786,985 B1 | 7/2014 | Grobis et al. |
| 8,793,431 B2 | 7/2014 | Bandic et al. |
| 8,879,183 B1 * | 11/2014 | Weikal ........................... 360/48 |
| 2001/0014070 A1 * | 8/2001 | Ando et al. ................. 369/59.25 |
| 2008/0250509 A1 | 10/2008 | Ahvenainen |
| 2010/0232048 A1 * | 9/2010 | Aida ............................... 360/48 |
| 2011/0026328 A1 * | 2/2011 | Moshayedi .............. 365/185.18 |
| 2011/0085266 A1 | 4/2011 | Kanai et al. |
| 2013/0148225 A1 * | 6/2013 | Coker et al. .................... 360/31 |
| 2014/0098438 A1 | 4/2014 | Poudyal |

* cited by examiner

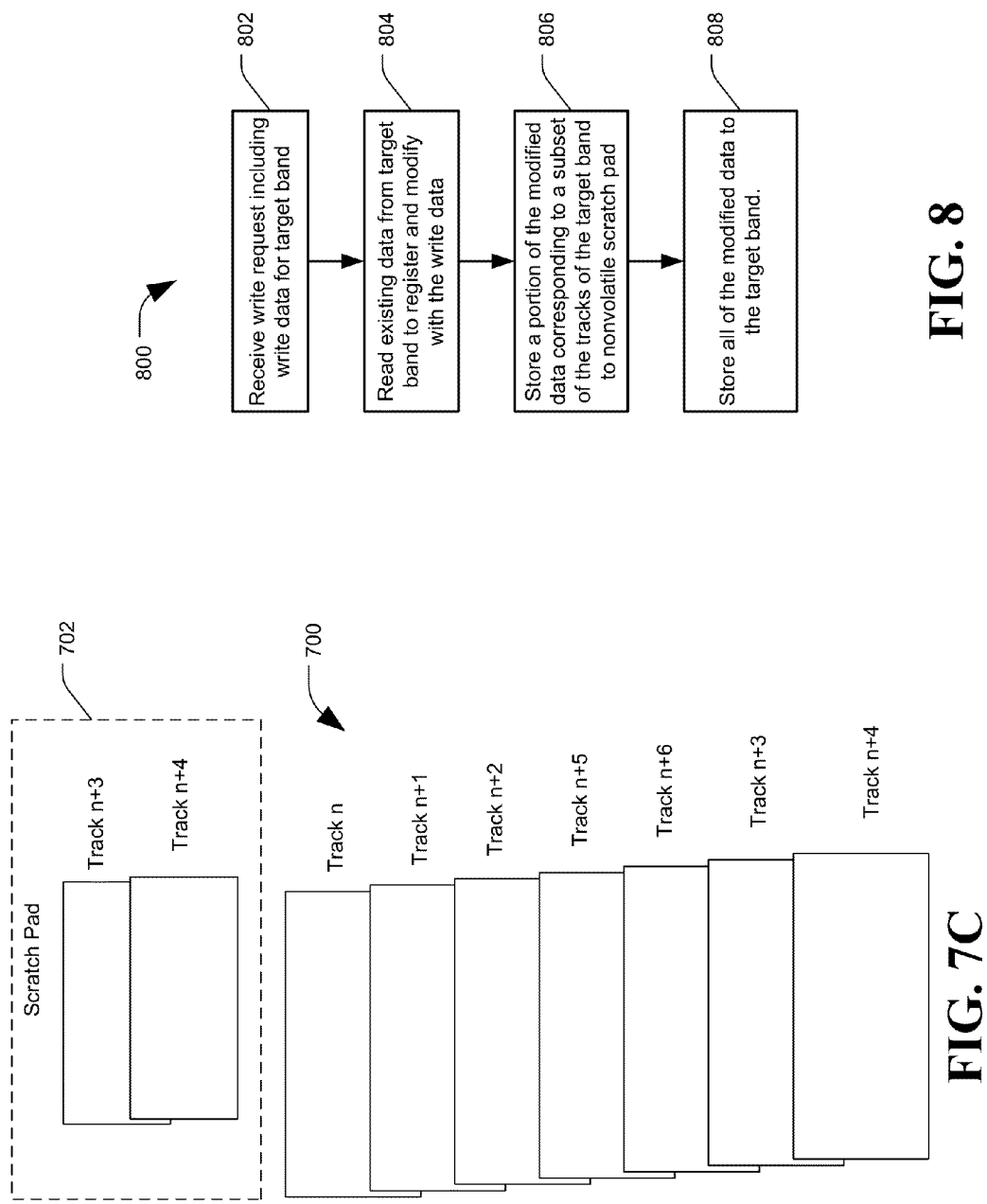

Initial State:

1100

| | | | | | | | | |
|---|---|---|---|---|---|---|---|---|
| PT 1 | Defect | Defect | 1 | 1 | 1 | 1 | 1 | 1 |
| PT 2 | 2 | 2 | 2 | 2 | 2 | 2 | 2 | 2 |
| PT 3 | 3 | 3 | 3 | 3 | 3 | 3 | 3 | 3 |
| PT 4 | 4 | 4 | 4 | 4 | 4 | 4 | 4 | 4 |
| PT 5 | 5 | 5 | 5 | 5 | 5 | 5 | 5 | 5 |

1102

Scratch Pad

| | | | | | | | | |
|---|---|---|---|---|---|---|---|---|
| DT 1 | 1 | 1 | 1 | 1 | 1 | 1 | | |
| DT 2 | 2 | 2 | 2 | 2 | 2 | 2 | 2 | 2 |

After Rewriting Data Track 3:

1110

| | | | | | | | | |
|---|---|---|---|---|---|---|---|---|
| PT 1 | Defect | Defect | 3N | 3N | 3N | 3N | 3N | 3N |
| PT 2 | 3N | 3N | 2O | 2O | 2O | 2O | 2O | 2O |
| PT 3 | 3O | 3O | 3O | 3O | 3O | 3O | 3O | 3O |
| PT 4 | 4O | 4O | 4O | 4O | 4O | 4O | 4O | 4O |
| PT 5 | 5O | 5O | 5O | 5O | 5O | 5O | 5O | 5O |

After Performing BRO:

1120

| | | | | | | | | |
|---|---|---|---|---|---|---|---|---|
| PT 1 | Defect | Defect | 3 | 3 | 3 | 3 | 3 | 3 |
| PT 2 | 3 | 3 | 4 | 4 | 4 | 4 | 4 | 4 |
| PT 3 | 4 | 4 | 5 | 5 | 5 | 5 | 5 | 5 |
| PT 4 | 5 | 5 | 1 | 1 | 1 | 1 | 1 | 1 |
| PT 5 | 2 | 2 | 2 | 2 | 2 | 2 | 2 | 2 |

FIG. 11

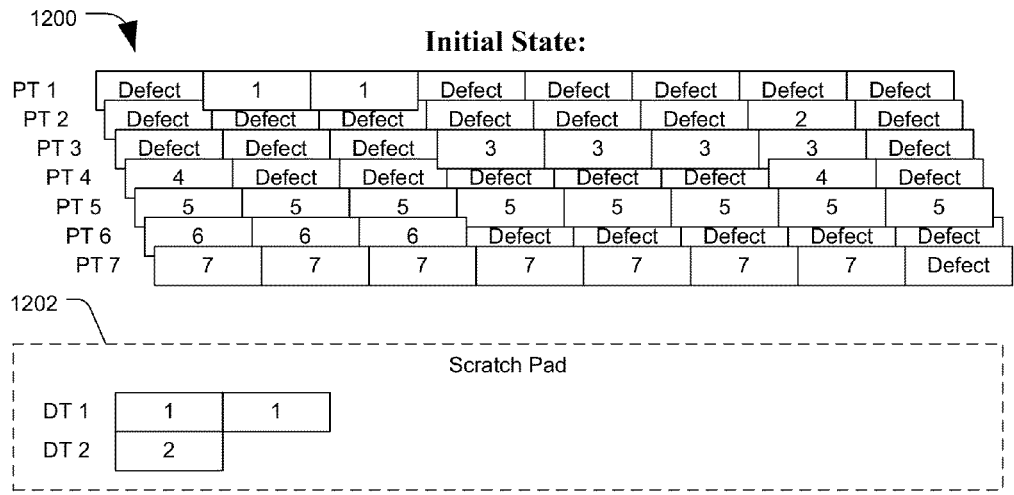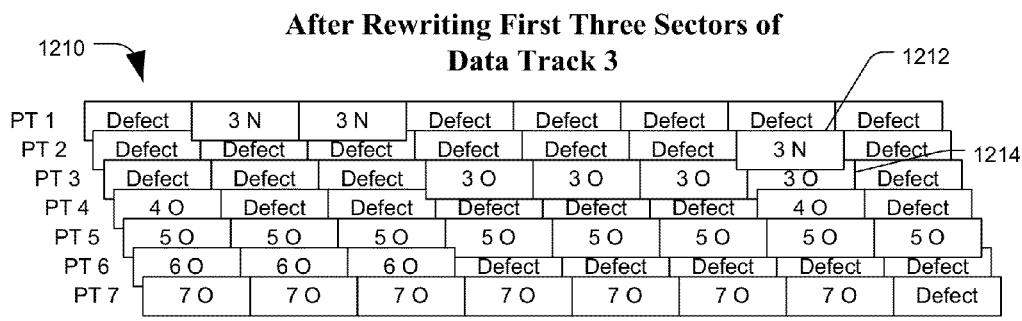
FIG. 12

REWRITE OPERATION FOR RECORDING BANDS

SUMMARY

In certain embodiments, an apparatus may comprise a circuit configured to read existing data from a target band including a plurality of data storage areas, modify the existing data with other data to create modified data, store a portion of the modified data to a nonvolatile memory, the portion being less than all of the modified data, and store the modified data to the target band.

In certain embodiments, a method may comprise reading existing data from a target band including a plurality of data storage areas of a data storage device, modifying the existing data with other data to create modified data, storing a portion of the modified data to a nonvolatile memory, the portion being less than all of the modified data, and storing the modified data to the target band.

In certain embodiments, a memory device may store instructions that, when executed, cause a processor to perform a method comprising reading existing data from a target band including a plurality of data storage areas of a data storage device, modifying the existing data with other data to create modified data, storing a portion of the modified data to a nonvolatile memory, the portion being less than all of the modified data, and storing the modified data to the target band.

BRIEF DESCRIPTION OF THE DRAWINGS

FIGS. 7A, 7B, and 7C are diagrams of examples of a system employing a rewrite operation for recording bands, in accordance with certain embodiments of the present disclosure;

FIG. 8 is a flowchart of a method for a rewrite operation for recording bands, in accordance with certain embodiments of the present disclosure;

FIG. 11 is a diagram of a system employing a rewrite operation for recording bands, in accordance with certain embodiments of the present disclosure;

FIG. 12 is a diagram of a system employing a rewrite operation for recording bands, in accordance with certain embodiments of the present disclosure.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that when executed cause a processor to perform the methods.

Figure 1:
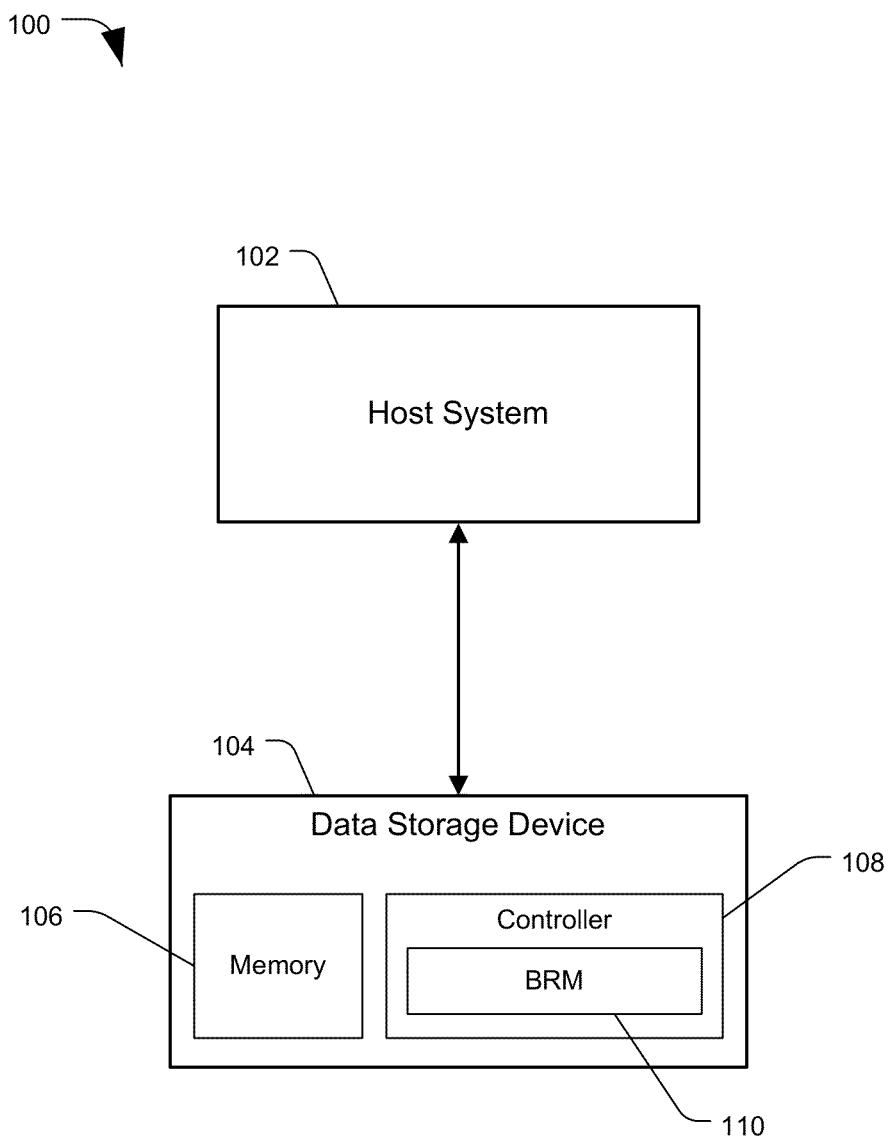
FIG. 1 is a diagram of a system employing a rewrite operation for recording bands, in accordance with certain embodiments of the present disclosure.

FIG. 1 is a diagram of a system 100 employing a rewrite operation for recording bands, in accordance with certain embodiments of the present disclosure. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data, such as an hard disc drive (HDD) or hybrid hard drive (HHD). The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing), or the host 102 and DSD 104 may both be part of a single unit (e.g. a computer having an internal hard drive).

The DSD 104 may include a memory 106 and a controller 108. The memory 106 may comprise magnetic storage media such as disc drives, nonvolatile solid state memories such as Flash memory, other types of memory, or any combination thereof. The controller 108 may comprise one or more circuits or processors configured to control operations of the data storage device 104, such as storing data to or retrieving data from the memory 106. The DSD 104 may receive a data read or write request from the host device 102, and use the controller 108 to perform data operations on the memory 106 based on the request.

In some embodiments memory 106, such as a disc recording medium, may include a plurality of concentric data tracks on a recording surface of the disc, either in the form of individual circular tracks, or one or more gradually spiraling tracks. Sets of contiguous tracks may be grouped into "bands" of tracks. The surface of the disc may be divided into a plurality of concentric zones (sometimes called data zones) of contiguous data tracks, and a zone may include one or more bands. In some embodiments, some or all of the tracks on a disc may be recorded in a shingled manner, where one track partially overlaps an adjacent track. Shingled recording can increase the amount of data which may be stored on a disc over non-shingled recording methods, but may introduce recording limitations as will be discussed in greater detail below.

DSD 104 may include a band rewrite module (BRM) 110. The BRM 110 may be one or more processors, controllers, or other circuits, or it may be a set of software instructions that, when executed by a processing device, perform the functions of the BRM 110. In some embodiments, the BRM 110 may be part of the controller 108, or executed by the controller 108. The BRM 110 may control operations of DSD 104 relating to band rewrite operations, such as the methods described in relation to FIGS. 8, 9, and 10. For example, the BRM 110 may control reading data from a band, modifying the data with new write data, and storing the modified data to the band. In some embodiments, BRM 110 may store a subset of the modified data, such as data corresponding to a first set of tracks of the band, to a nonvolatile area of memory during the rewrite process, and being storing modified data to the band starting with data corresponding to a later track of the band. Other embodiments are also possible.

Figure 2:
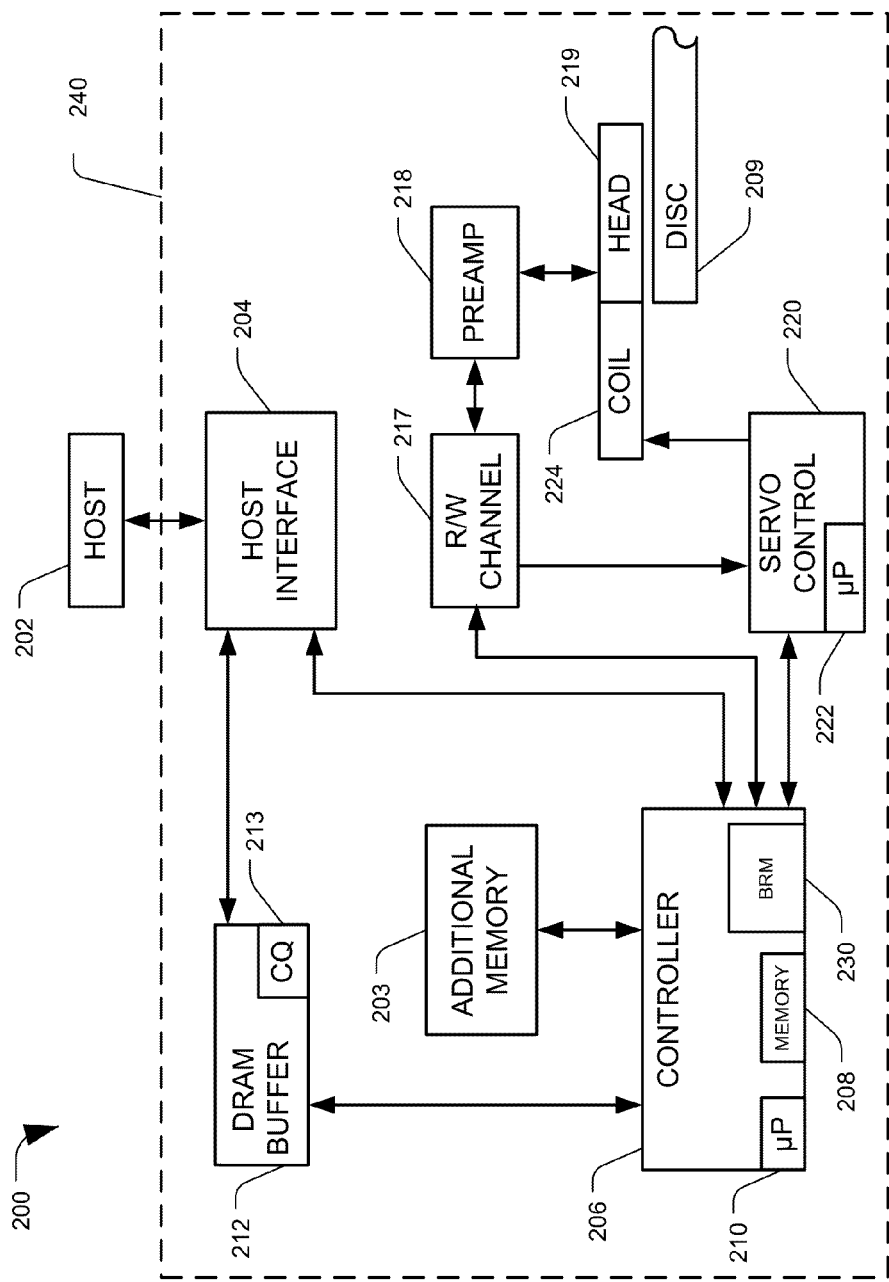
FIG. 2 is a diagram of a system employing a rewrite operation for recording bands, in accordance with certain embodiments of the present disclosure.

FIG. 2 is a diagram of a system employing a rewrite operation for recording bands, in accordance with certain embodiments of the present disclosure. Specifically, FIG. 2 provides a functional block diagram of an example data storage device (DSD) 200. The DSD 200 may be a data storage device such as the device 104 shown in FIG. 1. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as universal serial bus (USB), institute of electrical and electronics engineers (IEEE) standard 1394, Compact Flash, serial advanced technology attachment (SATA), external SATA (eSATA), parallel ATA (PATA), small computer system interface (SCSI), serial attached SCSI (SAS), peripheral component interconnect express (PCIe), Fibre Channel, Ethernet, or Thunderbolt, among others. The interface 204 may include a connector (not shown) that allows the DSD 200 to be physically removed from the host 202. In some embodiments, the DSD 200 may have a casing 240 housing the components of the DSD 200, or the components of the DSD 200 may be attached to the housing, or a combination thereof. The DSD 200 may communicate with the host 202 through the interface 204 over wired or wireless communication.

The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component. Buffer 212 may function as a register for performing certain calculation tasks, e.g. by controller 206.

The DSD 200 can include a programmable controller 206, which can include associated memory 208 and processor 210. Memory 208 may provide a register for controller 206 to store data during processing operations. In some embodiments buffer 212 may function as a register instead of or in addition to memory 208.

In some embodiments, the DSD 200 can include a read-write (R/W) channel 217, which can encode data during write operations and reconstruct user data retrieved from a memory, such as disc(s) 209, during read operations. A preamplifier circuit (preamp) 218 can apply write currents to the head(s) 219 and provides pre-amplification of read-back signals. Head(s) 219 may include a read head element and a write head element (not shown). A servo control circuit 220 may use servo data to provide the appropriate current to the coil 224, sometimes called a voice coil motor (VCM), to position the head(s) 219 over a desired area of the disc(s) 209. The controller 206 can communicate with a processor 222 to move the head(s) 219 to the desired locations on the disc(s) 209 during execution of various pending commands in the command queue 213. In some embodiments, the DSD 200 may include solid state memory instead of or in addition to disc memory. For example, the DSD 200 can include an additional memory 203, which can be either volatile memory such as DRAM or SRAM, or non-volatile memory, such as NAND Flash memory. The additional memory 203 can function as a cache and store recently or frequently read or written data, or data likely to be read soon. Additional memory 203 may also function as main storage instead of or in addition to disc(s) 209. A DSD 200 containing multiple types of non-volatile storage mediums, such as a disc(s) 209 and Flash 203, may be referred to as a hybrid storage device or hybrid hard drive (HHD).

DSD 200 may include a band rewrite module (BRM) 230. The BRM 230 may be a processor, controller, or other circuit, or it may be a set of software instructions that, when executed by a processing device, perform the functions of the BRM 230. In some embodiments, the BRM 230 may be part of the controller 206, or executed by the controller 206. The BRM 230 may control operations of DSD 200 relating to band rewrite operations, such as the methods described in relation to FIGS. 8, 9, and 10. For example, the BRM 110 may control reading data from a band, modifying the data with new write data, and storing the modified data to the band. In some embodiments, BRM 110 may store a subset of the modified data, such as data corresponding to a first set of tracks of the band, to a nonvolatile area of memory during the rewrite process, and being storing modified data to the band starting with data corresponding to a later track of the band. Other embodiments are also possible.

Figure 3A:
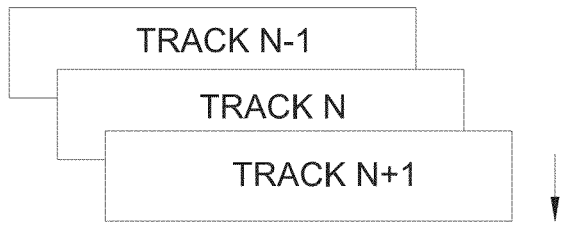
FIGS. 3A and 3B are diagrams of examples of a system employing a rewrite operation for recording bands, in accordance with certain embodiments of the present disclosure.
Figure 3B:
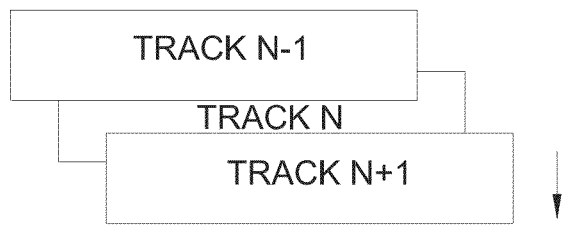

FIGS. 3A and 3B are diagrams of examples of a system employing a rewrite operation for recording bands, in accordance with certain embodiments of the present disclosure. As discussed above, data may be stored to data tracks in a shingled manner where one track partially overlaps an adjacent track. An example of shingled recording is shingled magnetic recording (SMR), for recording data to a magnetic disc medium. In some recording systems, the write head is wider than the read head. This can allow written tracks to be overlapped or "squeezed," while still allowing the narrower read head to reliably read data from the unshingled portion of the data track.

SMR is a scheme of executing a write operation in one radial direction across a disc, where tracks partially overlap each other similar to roofing shingles. Referring to FIG. 3A, if it is assumed that writing is performed in an arrow-indicated direction in the shingle-write scheme, when writing is performed on track N (e.g. where N is in integer), adjacent track N−1 may be partially overwritten. Also, when writing is performed on track N+1, adjacent track N may be partially overwritten. In contrast to recording methods whereby each track is written without any intended overlap, SMR can result in an increase of the tracks per inch (TPI) characteristic as a recording density in a radial direction of a storage medium.

However, if a track is "squeezed" too much, for example by being overlapped by both adjacent tracks, data on the track may become difficult or impossible to read. As illustrated in FIG. 3B, after writing on track N, if track N–1 is written in a reverse direction of the shingled recording direction, track N may become unreadable due to Adjacent Track Interference (ATI), or being partially overwritten by both adjacent tracks (i.e. track N–1 and track N+1). Therefore, changing the data recorded to track N–1 after track N is recorded, or the data recorded to track N after track N+1 is recorded, may require a different writing strategy than with non-shingled tracks, which can simply be overwritten at any time. In some embodiments, it may be advantageous to follow a constraint that track N–1 cannot be written after track N is written. A set writing direction may therefore be designated for a set of tracks, so that tracks are written one after another in the set direction.

It should be understood that the positive recording direction may be from the inner diameter (ID) to the outer diameter (OD) of the recording medium, or vice versa. The positive direction may even be different per zone or per shingled recording band, where a shingled band may be a set of shingled tracks. For example, the positive recording direction may be selected for a given set of tracks based on a write head's writing capabilities in different directions at different points over a recording medium.

Figure 4:
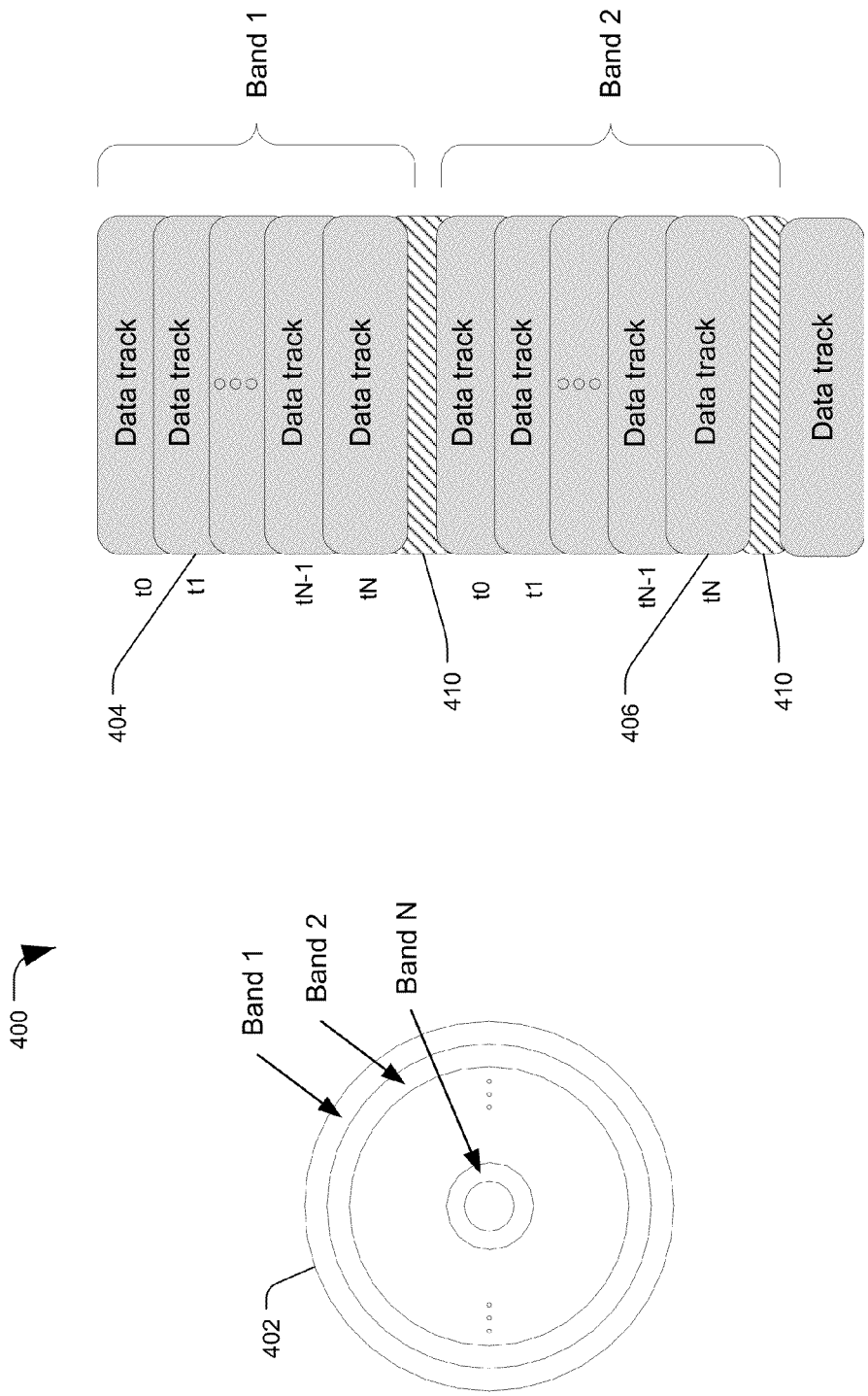
FIG. 4 is a diagram of a system employing a rewrite operation for recording bands, in accordance with certain embodiments of the present disclosure.

FIG. 4 is a diagram of a system 400 employing a rewrite operation for recording bands, in accordance with certain embodiments of the present disclosure. Due to the track write overlap of SMR, writing a given track N–1 after track N has been written may require rewriting all shingled tracks that following track N–1 (i.e. track N, track N+1, track N+2, etc.). In order to accomplish this efficiently, a set of shingled tracks may be grouped into a band, such that writing the last track of a given band X (e.g. where X is an integer) does not require rewriting any of the following tracks in bands X+1, X+2, X+3 and so on. Rotating disc media 402 may be divided into a plurality of bands (e.g. Band 1, Band 2, etc.), and each band may contain a plurality of shingled data tracks. In some embodiments, a disc may be divided into a plurality of data zones including a plurality of tracks, and each data zone may include one or more shingled recording bands. Bands may have a number of shingled tracks 404, such as tracks t0 through tN–1 of FIG. 4 (e.g. where N is an integer), which are partially overlapped by adjacent tracks and have a reduced track width. For example, the shingled or overlapped tracks 404 may have a reduced read width relative to their write width.

Separating bands so that rewriting one does not require rewriting tracks outside the band can be accomplished by defining the tracks such that the last track of a band is not trimmed or overlapped by a track that can be written. The last track of a band may be referred to as a "fat track" 408, such as track tN of FIG. 4, since it is not overlapped by another track to reduce its width. Fat tracks can be achieved in a number of ways. For example, track spacing may be formatted so that the last track of each band does not have an overlapping track adjacent. In some embodiments, one or more tracks following each end-of-band fat track 408 can be designated as "not to be written." Not-to-be-written tracks may be referred to as "guard tracks" 410, as they provide band boundaries to separate writable tracks of different bands and guard the last track 406 of a band from being trimmed by or trimming tracks outside the band. In some embodiments, a single guard track 410 may be used, while in some embodiments multiple tracks may be designated as "not to be written" between bands to provide a larger buffer against ATI. A guard track 410 or set of contiguous guard tracks may also be referred to as a guard band or isolation track.

Because the last track 406 is not overlapped by a writable track, the band can be rewritten without affecting tracks outside the band. When track t0 of Band 1 needs to be re-written, tracks t0 to the fat track tN 406 of Band 1 can be rewritten, while tracks in other bands, such as Band 2, are not affected.

When data is to be written to a shingled band, the data may be recorded to tracks of the band in a set order starting with track t0 and continuing until track tN has been recorded. If data is to be stored to a shingled track within the band, the data of the target track and all following tracks must be rewritten to avoid data loss. A process of rewriting data to the band, which may be referred to as a band rewrite operation (BRO), a read-modify-write (RMW), or a read-modify-write-write (RMWW) may be performed. The BRO or RMW may include reading data from target band and storing a copy to a separate memory location, such as a register or cache memory, modifying the copy of the data with the new data to be written, and rewriting the modified data back to the band. In some embodiments, all the data from a band may be read, modified, and re-written. In some embodiments, only a subset of the tracks of the target band may be read, modified, and re-written. For example, if the data is to be written to track 13 of a 20-track band, the BRO may include reading all tracks from track 13 through track 20, from track 10 through track 20, or any other subset including the target track through the last written track of the band.

However, if the modified copy of the data is stored in a volatile memory and an unexpected power loss occurs when writing data to the band, data within the band may be corrupted. For example, if power loss occurs while writing to track t0, track t1 may be partially overlapped by both adjacent tracks and become unreadable. In order to prevent this, the BRO may include performing a RMWW operation. The RMWW may differ from the RMW in that, prior to writing the modified data back to the band, the modified data is written to another area of a nonvolatile memory, which may be called a scratch pad. For example, the scratch pad may include a NAND Flash memory, or a shingled or non-shingled location of a disc memory separate from the target band. If an unexpected write interruption occurs when storing data to the target band, the copy of the data in the scratch pad may be used for data recovery. Once the modified data has been written safely to the target band, the copy of the data in the scratch pad may be overwritten with other data.

A RMWW that requires reading data from a target band, writing the data to the scratch pad, and writing the data again to the target band may include up to three read/write operations for up to every track in the band. A full BRO may therefore take a significant amount of time, potentially causing other pending operations to time out or otherwise hindering device throughput. Accordingly, reducing the length of a BRO may reduce delays and improve device performance.

Figure 5B:
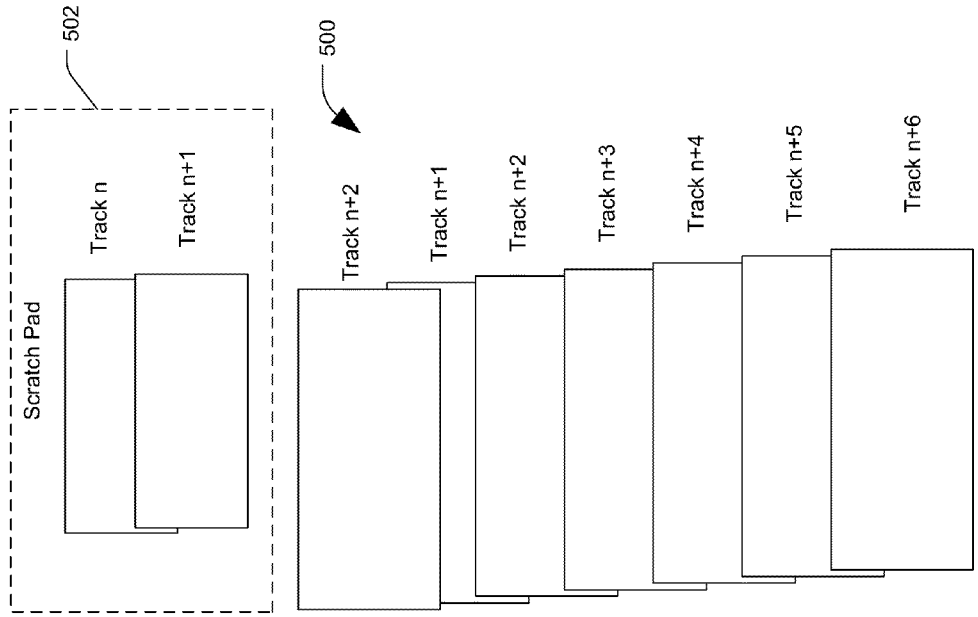
FIGS. 5A, 5B, and 5C are diagrams of examples of a system employing a rewrite operation for recording bands, in accordance with certain embodiments of the present disclosure.
Figure 5A:
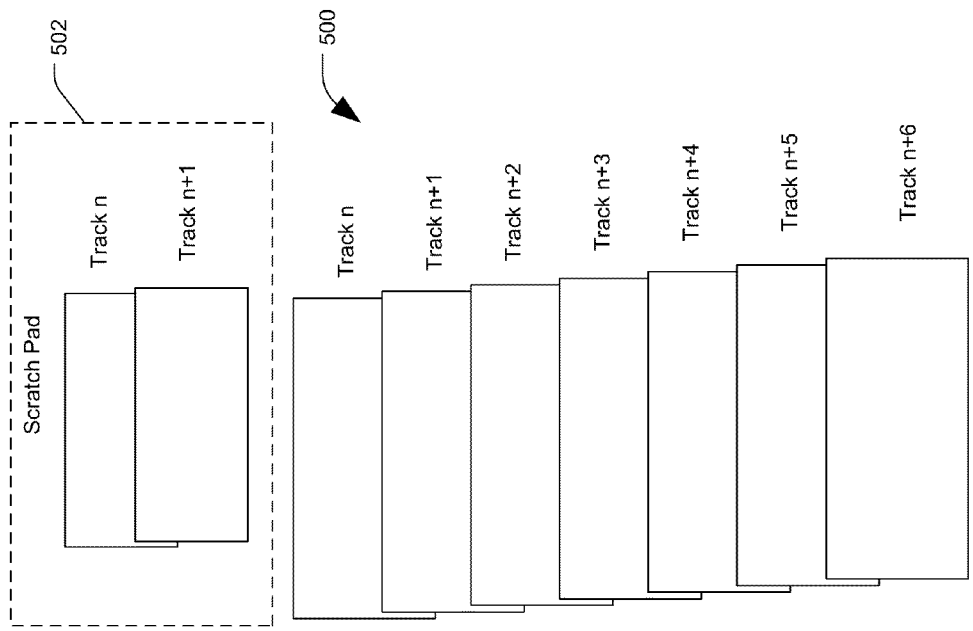
Figure 5C:
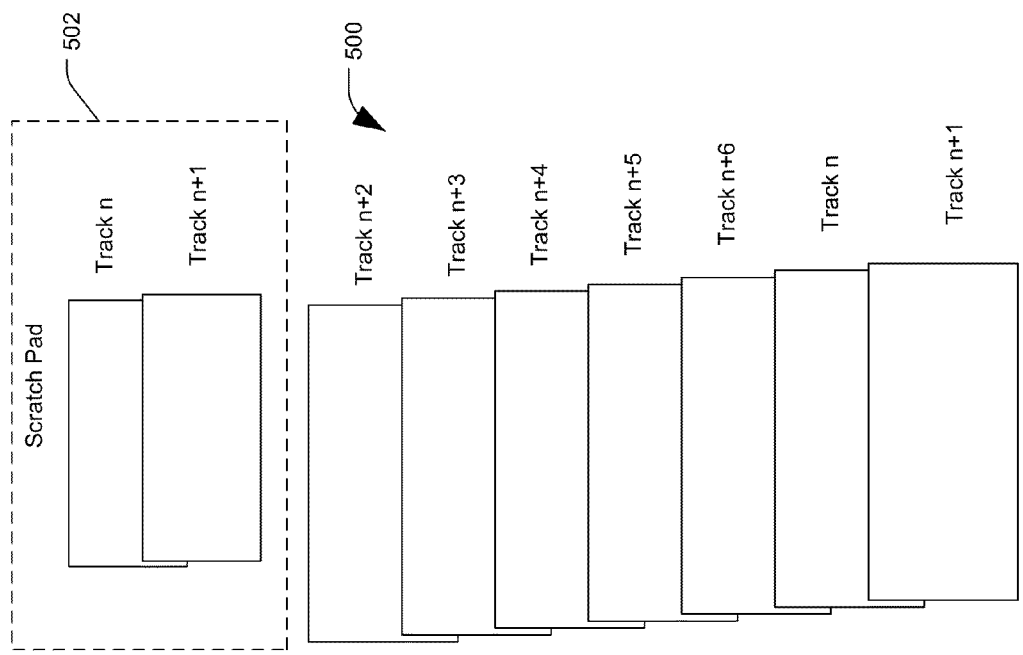

Turning now to FIGS. 5A, 5B, and 5C, diagrams of examples of a system employing a rewrite operation for recording bands are shown, in accordance with certain embodiments of the present disclosure. FIG. 5A depicts a target band 500 for data of a write operation. The band 500 may have seven data tracks, track n (e.g. where n is an integer) through track n+6. A data storage device including the band 500 may be configured to perform a BRO to store the write data to the target band 500, for example using a band rewrite module (BRM). The BRO may include reading the data from the target band 500, and storing a copy to a register, buffer, cache, or other working memory space. The copy of the data may be modified with the write data received as part of the write command, for example by replacing old data from a set of LBAs with new data directed to the same LBAs.

Rather than writing the modified data for the entire band 500 to a nonvolatile scratch pad memory area 502, the BRO may include storing only data associated with the first two tracks of the band, tracks n and n+1, to the scratch pad 502. Turning to FIG. 5B, the BRO may involve storing the modified data associated with the third track of the target band, track n+2, to the first physical track of the band 500. As shown in FIG. 5B, the first physical track, track n, has been overwritten with track n+2. Accordingly, the original data for tracks n and n+1 may now be unreadable, since track n has been overwritten and track n+1 has been overlapped by both adjacent tracks. However, the modified data for tracks n and n+1 is stored in the scratch pad 502, so the data has not been lost. The physical tracks of target band 500 may now be written in order with data corresponding to tracks following n+2. When the data for track n+3 is recorded to physical track n+1, the original track n+2 may become unreadable, but the modified data for track n+2 has already been safely written to physical track n.

FIG. 5C depicts target band 500 after the tracks have all been rewritten with the modified data. Physical track n has been overwritten with the data corresponding to track n+2, physical track n+1 has been overwritten with the data for track n+3, etc. After data corresponding to the final track n+6 is written, the BRO may involve writing the modified data for tracks n and n+2 to the final two physical tracks of the band 500. The copies of the data for tracks n and n+2 stored to the scratch pad may now be erased or overwritten. In the depicted embodiment, each track has "shifted" up by two positions. No data was ever in danger of loss or corruption from an unexpected power interruption, and only two tracks of the target band 500 were written to the scratch pad 502. While the example of FIGS. 5A through 5C included a band with only 7 tracks, writing two tracks to the scratch pad 502 would be sufficient for normal writes to bands of any number of tracks. For larger bands, this can provide a substantial time reduction for a BRO. By archiving a selected number of tracks or data sectors to a scratch pad, a shingled band may be rewritten largely in-place without the need for internal isolation tracks or sectors. For example, internal isolation tracks or sectors may be tracks or sectors within the band itself which, like the guard band, are designated as not to be written.

Figure 6:
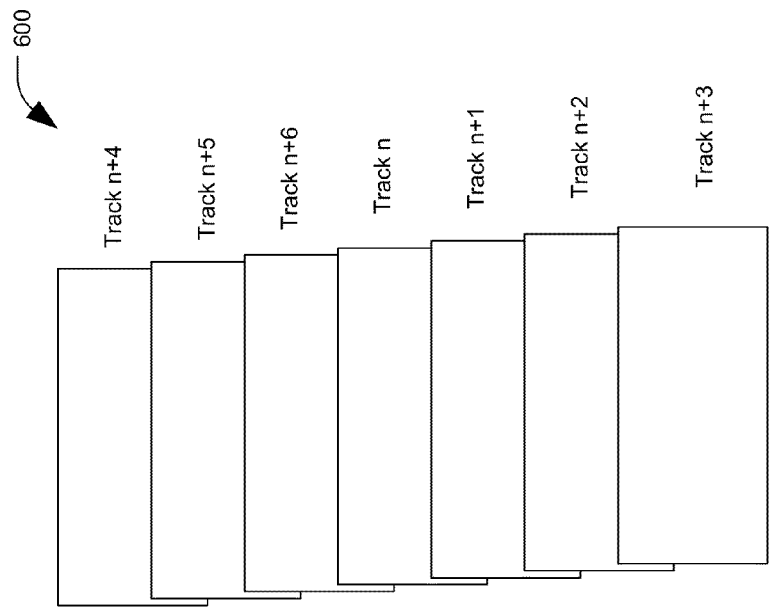
FIG. 6 is a diagram of a system employing a rewrite operation for recording bands, in accordance with certain embodiments of the present disclosure.

FIG. 6 is a diagram of a system employing a rewrite operation for recording bands, in accordance with certain embodiments of the present disclosure. In particular, FIG. 5 depicts an example band 600, such as band 500 of FIGS. 5A-5C, after performing two BROs. If the entire band 600 was rewritten again as part of the BRO, the tracks can once again be shifted up by two tracks. Band 600 may now have track n+4 as a first track, and may end with tracks n, n+1, n+2, and n+3.

A data storage device (DSD) employing the band rewrite operation as described herein may be configured to update metadata related to the target band to reflect the shifted tracks. For example, the DSD may store a mapping table or other data structure to keep track of track order within a band, logical block address (LBA) to physical sector mapping, other information, or a combination thereof. For example, track offsets may be updated and stored to reflect the rotation of the tracks after a BRO.

Figure 7A:
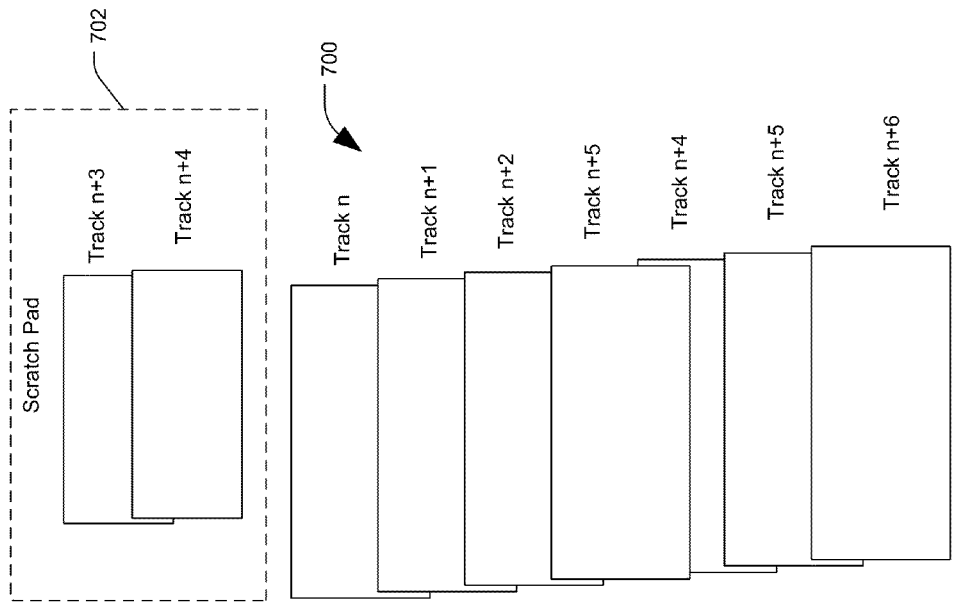
Figure 7B:
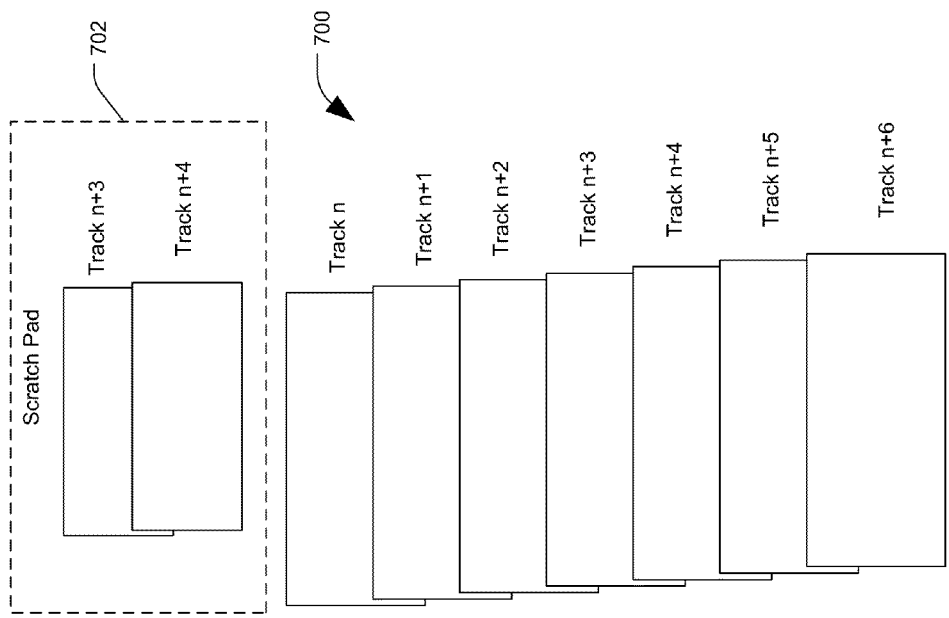

FIGS. 7A, 7B, and 7C are diagrams of examples of a system employing a rewrite operation for recording bands, in accordance with certain embodiments of the present disclosure. In particular, FIGS. 7A-7C depict how the band rewrite operation as described above may be applied to a "partial BRO," where only a subset of the tracks of a band are rewritten. For example, a DSD may receive a write command to store or update data on track n+3 of band 700 of FIG. 7A. The DSD may read only track n+3 through track n+6 into a register for modification, since track n+3 can be written without the need to rewrite tracks n through n+2. After modifying the copy of the read data, the DSD may store tracks n+3 and n+4 to the scratch pad 702. As shown in FIG. 7B, the DSD may then overwrite track n+3 of the target band 700 with the data corresponding to track n+5. FIG. 7C shows the band 700 after completion of the BRO. The first tracks n through n+2 have not changed from before beginning the BRO. Tracks n+3 and n+4 were overwritten with tracks n+5 and n+6, respectively. Tracks n+3 and n+4 were recorded at the end of the band 700. In this embodiment, the tracks did not simply shift up two tracks for the entire band. However, partial BROs can further shorten the time required to update a shingled band.

While the examples of FIGS. 5 through 7 show every track up through the last track of a band as being read and rewritten, it should be noted that other embodiments are also possible. For example, in a band of seven tracks, only the first 4 may contain valid data. If data corresponding to LBAs stored on, e.g. the second track are to be updated, only the four tracks containing valid data may be rotated according to the BRO process described herein, without the need to read, write, or rotate the three tracks at the end of the band that do not contain valid data.

FIG. 8 is a flowchart of a method 800 for a rewrite operation for recording bands, in accordance with certain embodiments of the present disclosure. Method 800 may be performed by a data storage device (DSD), for example using a band rewrite module (BRM). The method 800 may include receiving a write request including write data for a target band of a DSD, at 802. For example, the write request may include data to be stored to the DSD, and associated logical block addresses (LBAs) for the write data. The DSD may translate the LBAs to physical sectors of the target band.

Existing data may be read from the target band to a register, and modified with the write data from the write command, at 804. For example, a copy of data from some or all of the tracks of the target band may be stored to a memory on a processor, a buffer memory, or some other temporary memory location. The write data from the write command may be added to or replace data from the target band, creating modified data.

A portion of the modified data corresponding to a subset of the tracks of the target band may be stored to a nonvolatile scratch pad area of memory, at 806. For example, if data was read from all of the tracks of the target band, at 804, modified data corresponding to the first two tracks of the band may be stored to a scratch pad area. If only tracks 10 through 20 of a 20-track band were read and modified, tracks 10 and 11 may be stored to the scratch pad. The scratch pad may include a solid state memory such as NAND Flash, or it may be a reserved area of a disc memory. In some embodiments, a scratch pad area of a disc may be configured to store data in a non-shingled manner. Other embodiments are also possible.

The method 800 may include storing all of the modified data to the target band, at 808. For example, if every track of a band was read and modified, every track of the band may be rewritten with modified data. If only the last ten tracks were read and modified, for example, the last ten tracks may be written with modified data. The tracks that were read, modified, and rewritten may be "rotated" within the band. For example, every read and modified track may be shifted up two tracks, so that the last two tracks of the band are written with modified data from the first two tracks read.

Once the modified data has been stored to the target band, the portion of the modified data stored in the scratch pad area may be erased or overwritten. Metadata related to the rewritten band or storage sectors may be updated to reflect the rotated data tracks. For example, the metadata may be stored to a RAM during operation of the DSD, and periodically saved to a nonvolatile memory.

Figure 9:
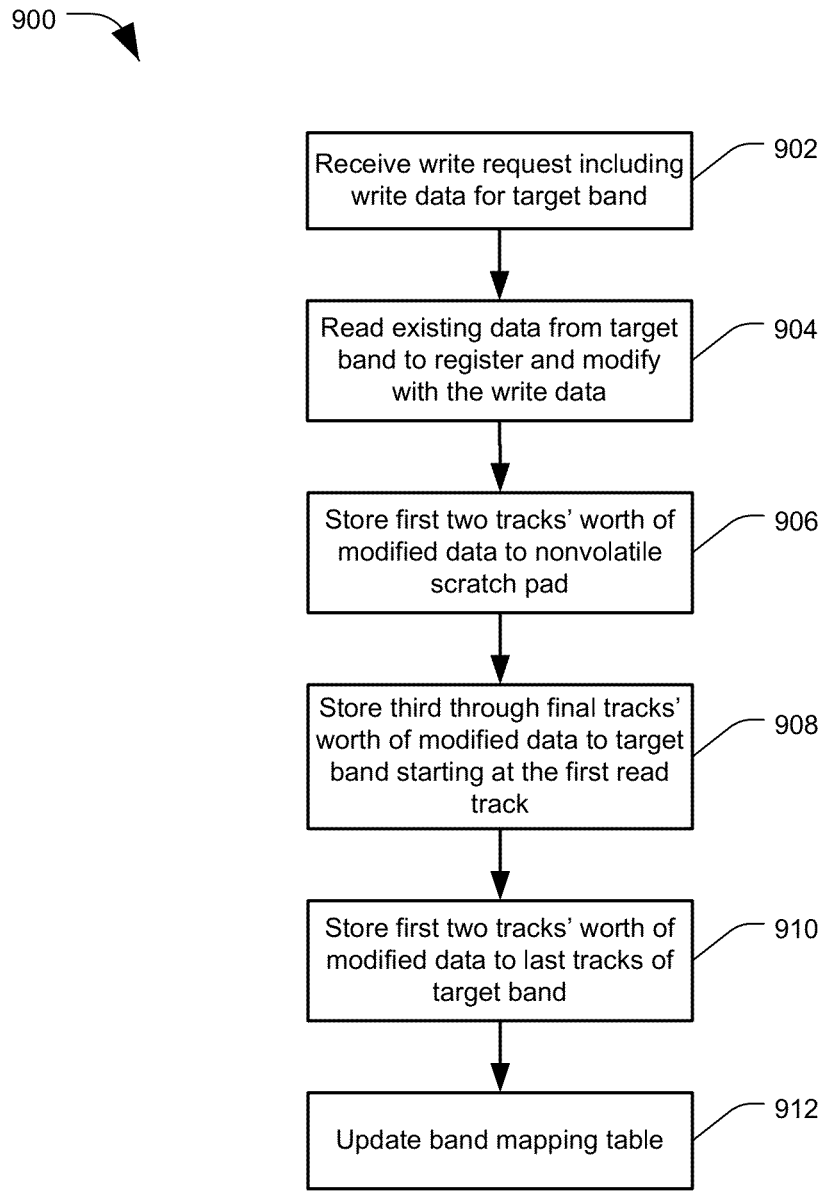
FIG. 9 is a flowchart of a method for a rewrite operation for recording bands, in accordance with certain embodiments of the present disclosure.

FIG. 9 is a flowchart of another method 900 for a rewrite operation for recording bands, in accordance with certain embodiments of the present disclosure. A write request may be received, at 902, and existing data may be read from the target band and modified, at 904, as elaborated on with regard to 802 and 804 of FIG. 8. Method 900 may include storing modified data corresponding to the first two tracks read from the target band to a nonvolatile scratch pad, at 906. For example, the first two tracks read may be the first two tracks of the target band, in a full-band BRO, or it may be the first two tracks read from within the band, in the case of a partial BRO.

Modified data, corresponding to the range of tracks from third read track through the final read track, may be stored to the target band starting with the first track to be rewritten, at 908. For example, the first read track may be overwritten with modified data from the third read track, the second read track may be overwritten with modified data from the fourth read track, etc.

The first two tracks of modified data may be stored to the final two physical tracks of the target band, at 910. As an example, a target band may comprise a plurality of data tracks, including a first data track at a first physical end of the target band, a second data track adjacent to the first data track, a third data track adjacent to the second data track, a penultimate data track adjacent to an ultimate data track, and the ultimate data track at a second physical end of the target band opposite the first physical end. Data may be read from all of the data tracks and modified with new data. Rewriting the target band may include storing a portion of the modified data corresponding to the third data track to the first data track, and storing a portion of the modified data corresponding to the first data track and the second data track to the penultimate data track and the ultimate data track, respectively. Each track may be shifted up by two tracks, according to some embodiments.

The method 900 may include updating a mapping table to reflect the shifted tracks of the band, at 912. Data corresponding to the band stored in the scratch pad may be marked as invalid data.

Figure 10:
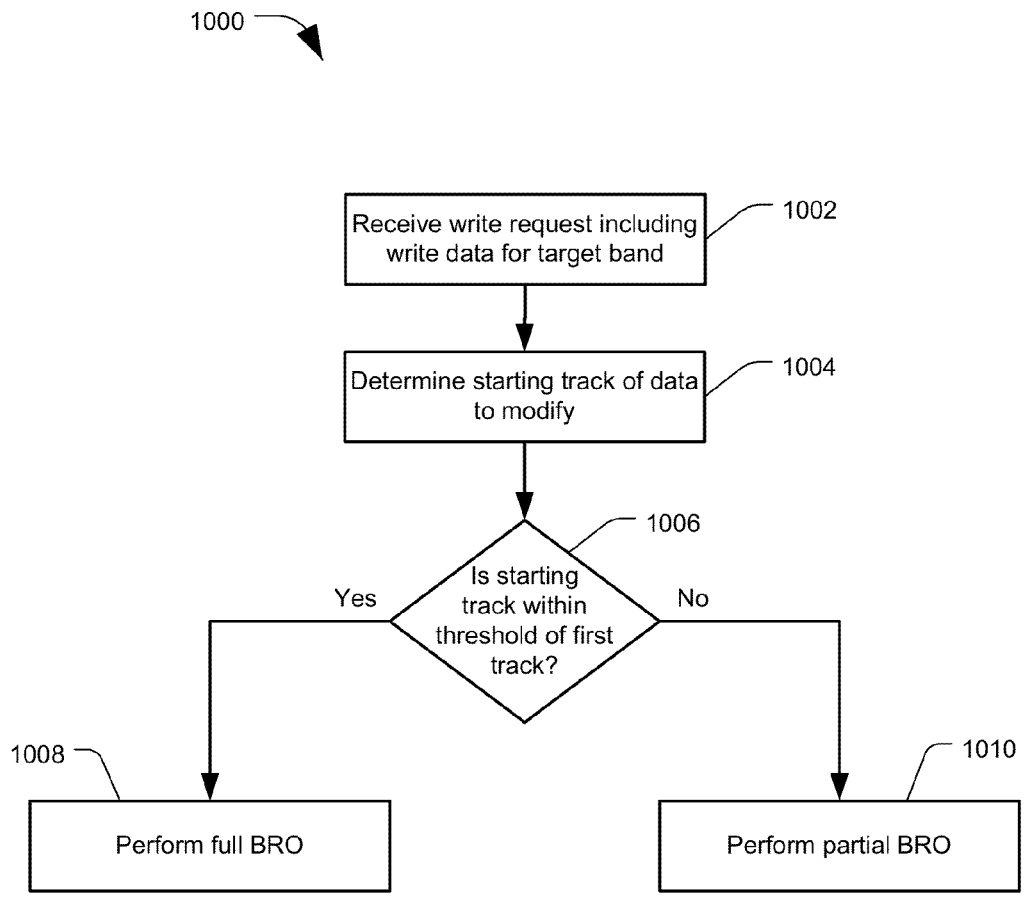
FIG. 10 is a flowchart of a method for a rewrite operation for recording bands, in accordance with certain embodiments of the present disclosure.

FIG. 10 is a flowchart of another method 1000 for a rewrite operation for recording bands, in accordance with certain embodiments of the present disclosure. Method 1000 may involve receiving a write request including write data for a target band, at 1002.

Method 1000 may include determining a starting track of data to modify, at 1004. For example, the write data may update data currently stored on track five of the target band. While examples of the present disclosure have addressed receiving write commands and performing BROs based on those write commands, it should be understood that a data storage device (DSD) may include numerous pending write operations in a command queue, or include data for multiple writes in a temporary cache, for example. When multiple write operations are directed to the same target band, the DSD may perform a single BRO and incorporate changes from multiple write operations at the same time. Accordingly, in some embodiments of FIG. 10, the method may include determining a starting track of the target band to be modified based on multiple pending write operations for the target band.

If the starting track is within a threshold of a first track of the target band, at 1006, the method 1000 may include performing a full BRO, at 1008. For example, a DSD may be configured to perform both full BROs, which may rewrite every track in a band, and partial BROs, which may only write a subset less than all tracks in a band. In some embodiments, a band may be subdivided into subsections, such as 10-track "chunks", for determining which tracks to rewrite. For example, suppose a band contains 100 tracks, and data on the $8^{th}$ track is to be updated. Since the $8^{th}$ track is within the first 10 tracks, the DSD may perform a full BRO on the band. However, if data on the $56^{th}$ track is to be updated, the DSD may perform a partial BRO starting with the $51^{st}$ track. In some embodiments, a DSD may be configured to perform partial BROs with single-track granularity, starting with whatever track is to be updated by a write command. Other embodiments are also possible.

If the starting track is not within a threshold of the first track, at 1006, the method 1000 may include performing a partial BRO, at 1010. In some embodiments as described above, there may be multiple thresholds corresponding to "chunks" of the band. For example, if the first track to be rewritten is less than 11, a full BRO may be performed. If the first track is greater than 10 but less than 21, a partial BRO starting with the $11^{th}$ track may be performed, etc. Other embodiments are also possible.

While embodiments of the BRO process described herein provide examples of storing modified data for two tracks to a scratch pad, and re-writing data as units of whole tracks, the process is not limited to such embodiments. For example, more than two tracks may be stored to the scratch pad. If, for example, one or more tracks contain defective sectors that may require adjusting how data is rewritten to the band (e.g. to account for sector slipping), storing more than two tracks to the scratch pad may be desirable. In some embodiments, data for three, four, or more tracks may be stored to the scratch pad to account for adjusting how data is shifted or rewritten, or to account for the possibility of errors during writing that may corrupt data on tracks more than one track away from the current track. For example, in some embodiments writing a shingled track may overwrite not just the immediately adjacent tracks on each side, but also tracks two, three, or more tracks away from the target track. In some embodiments, fractions of tracks may also be stored to the scratch pad, such as based on a number of data sectors. For example, two full tracks and 30 data sectors from a third track may be stored. Writing data back to the band may start with a first sector following the archived sectors stored to the scratch pad, or it may start with sectors following the data from the first two physical tracks, even if more tracks were archived. Other embodiments are also possible.

FIG. 11 is a diagram of a system employing a rewrite operation for recording bands, in accordance with certain embodiments of the present disclosure. FIG. 11 depicts a band of five physical tracks (PT), each containing eight sectors. Data initially stored to the physical sectors of a given track may be referred to as data tracks (DT), with DT 1 corresponding to the data initially stored to PT 1. Each sector of data of a DT may be represented by a block containing a number of the data track (e.g. every sector from DT 1 is marked with a 1), to represent how the sectors may be relocated or shifted during a BRO.

Band 1100 depicts an initial state of the described band. PT 1 includes two defective sectors where data is not recorded because reading or writing data to the sector is unreliable, for example because of some physical defect of the storage medium. Accordingly, PT 1 contains only six usable sectors instead of eight.

In some embodiments, sector "alternating" or "reallocation" may be used to handle defective sectors. With alternating or reallocation, data intended for a specified defective sector may instead be stored to a spare sector at some other location on the storage medium. For example, a disc memory may contain a zone of unshingled tracks designated as spare sectors, where random data writes can be performed to store data from defective sectors. In such embodiments, the BRO as described herein may be performed by reading data from PT 1 and 2, and the alternated sectors from another location, and store them to the scratch pad. PT 1 and 2 and the alternate sectors may be rewritten with the modified data from track 3. In some embodiments using alternating, the total capacity of the band remains the same because defective sectors are not "lost," but rather relocated.

In some embodiments, sector slipping may be used to handle defective sectors. Sector slipping may refer to skipping over the defective sectors, and storing data to the next usable or valid sector instead. Depending on the implementation, this may reduce the overall storage capacity of band 1100, as defective sectors are not usable and data is not relocated elsewhere outside the band. Accordingly, band 1100 with two defective sectors may have thirty-eight usable data sectors instead of forty.

In some embodiments employing sector slipping, a rewrite operation may be scheduled for band 1100. The device may store the first two data tracks (DT) of modified data, corresponding to data that was initially stored to the first two physical tracks (PT), to the scratch pad 1102. This may include storing only fourteen data sectors, because PT 1 included two defective sectors.

The device may begin storing the modified data to the band 1110 at PT 1, starting with modified data corresponding to DT 3. Newly recorded sectors are designated with an "N" for "new," while the previously recorded and not-updated data sectors are designated with an "O" for "old." For the purposes of the following examples, it will be assumed that data sectors are written from left to right, starting with the left-most sector. In actual implementation, skew due to a time delay of the write head seeking from one track to the next, or other design decisions or mechanical influences, may result in the sectors not being recorded in such a fashion. The current examples are used for simplicity, but one skilled in the art can recognize that differences may arise in implementation.

As can be seen with band 1110, due to the defective sectors on PT 1 and the sector slipping data storage approach, all of DT 3 may not fit onto PT 1. For example, DT 3 may include eight sectors of data, while PT 1 may only include six writable sectors. Accordingly, the last two sectors of data from DT 3 may be written to the first two sectors of the next track, PT 2. This can cause the new data for the last two sectors of DT 3 to be shingled over the first two sectors of the old data for track 3. Because updated data for the first two sectors has already been recorded to PT 1, no data would be at risk of loss here. However, as discussed above, skew or other influences may modify an order in which sectors are recorded, which may mean shingling data over PT 3 may be undesirable until all of the modified data for DT 3 has been recorded.

Band 1120 depicts the arrangement of the newly written modified data after completing the BRO. All of the data has been written to the band 1120 starting with DT 3, with sectors having been rotated or "pushed down" by two sectors due to the defective sectors and sector slipping writing operation.

FIG. 12 is a diagram of a system employing a rewrite operation for recording bands, in accordance with certain embodiments of the present disclosure. Band 1200 may represent an initial state of a band having seven physical tracks of eight sectors each, including many defective sectors. For example, PT 1 includes only two valid writable sectors, and PT 2 includes only a single writable sector. If data corresponding to only the first two physical tracks was stored to the scratch pad 1202, the scratch pad may contain only 3 sectors of data. In some embodiments, three sectors may provide an insufficient buffer to prevent data corruption from overwriting in case of power loss, for example.

As shown in band 1210, representing the state of the band after rewriting the first three sectors of DT 3, data may become corrupted with no non-volatile backup. Due to the arrangement of valid sectors, the third sector of DT 3, at 1212, is written to PT 2, partially overwriting the fourth and final writable sector of PT 3, at 1214, which contains data that has not been backed up to non-volatile memory. If an unexpected power loss occurred before the modified data for the last sector of DT 3 (1214) was rewritten, that data may be lost. In some embodiments, a data storage device may forego out-of-order track writing for a band containing a threshold number of defective sectors, to avoid potential data loss. For example, the device may store modified data for the entire band to the scratch pad before beginning the rewrite to the band itself. In some embodiments, a device may be configured to store additional data sectors to the scratch pad to prevent data loss in such circumstances.

Figure 13:
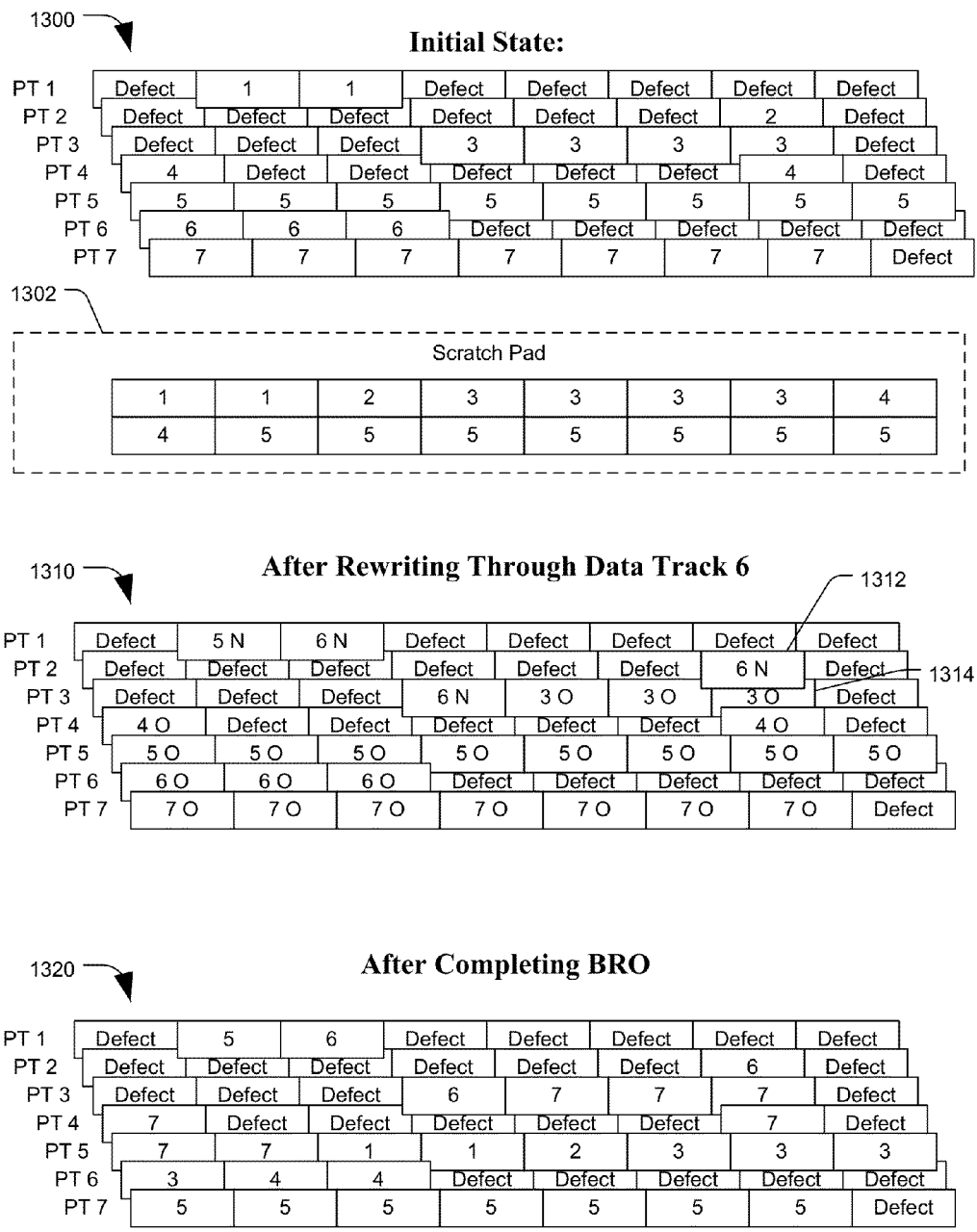
FIG. 13 is a diagram of a system employing a rewrite operation for recording bands, in accordance with certain embodiments of the present disclosure.

FIG. 13 is a diagram of a system employing a rewrite operation for recording bands, in accordance with certain embodiments of the present disclosure. Band 1300 again depicts the initial state of the band from FIG. 12. However, in the embodiment of FIG. 13, the device may be configured to store modified data for a number of sectors corresponding to two full physical tracks to the scratch pad 1302. For example, if each physical track of a band has eight sectors not counting errors, then the device may be configured to store the first sixteen sectors of data from a band to the scratch pad 1302, disregarding defective sectors. As can be seen in FIG. 13, this may involve storing modified data for the entirety of the first four physical tracks, as well as seven of the eight valid sectors from PT 5, totaling sixteen sectors of data. Data rewriting operations of the BRO may begin with the last sector of PT 5, as the first sector immediately following the archived sectors. In some embodiments, data rewriting may not need to begin with a first sector immediately after the archived sectors. For example, a device may archive a number of sectors corresponding to three full tracks (e.g. 24 sectors in the example of FIG. 13), and may commence rewriting with a first sector following the first two tracks' worth of sectors (e.g. commencing with the 17th valid sector, in the example of FIG. 13). Other embodiments are also possible.

Band 1310 represents the band after rewriting modified data for the last sector of DT 5 through all of the sectors of DT 6. When sector 1312 is written to partially overlap sector 1314, no data may be at risk of loss because modified data for sector 1314 is stored in the scratch pad 1302. Band 1320 depicts the band after the BRO has been completed, and no sectors were at risk of loss. By archiving a number of sectors corresponding to two full max-capacity tracks (e.g. the number of sectors in two tracks of the band, disregarding defects), potential data loss may be prevented. By archiving two full tracks of non-defective sectors, a buffer of at least one full physical track may be maintained between the write progress and data for which there is only one non-volatile copy. In embodiments where shingled writing may corrupt more than one track distant, additional maximum capacity tracks' worth of sectors may be archived. For example, if shingled writing corrupts the next two tracks, three max capacity tracks of sectors may be archived. Other embodiments are also possible.

While reference was made to tracks having a different number of valid sectors due to defects with regards to FIGS. 11-13, other embodiments are also possible. For example, tracks within a band may be configured to contain different numbers of sectors, such as if a band spans across a bit zone boundary. As discussed with regards to FIG. 13, it may be advantageous to archive a number of sectors corresponding to two tracks having the maximum sector capacity of the band. For example, if a band includes three tracks having eight sectors and three tracks having ten sectors, a drive may be configured to archive twenty sectors of data to the scratch pad. Other embodiments are also possible.

In some embodiments, the number of tracks stored to the scratch pad may be based on other monitored factors. For example, if the DSD has a light workload (e.g. less than a threshold number of pending operations) such that longer BRO operations will not seriously affect throughput, more tracks may be stored to the scratch pad, while under heavy workload conditions fewer tracks may be stored to the scratch pad. In some embodiments, an available capacity of the scratch pad area may be considered. For example, if a portion of a NAND Flash memory is used as the scratch pad, the DSD may determine how much space is available to set aside as a scratch pad to perform the BRO operation. If the Flash has ample space, more tracks may be stored, while if the Flash is low on free space, fewer tracks may be stored. Other embodiments are also possible.

By archiving the selected number of tracks or data sectors to a scratch pad, a shingled band may be rewritten largely in-place without the need for internal isolation tracks or sectors (e.g. tracks or sectors like the guard band, which are designated as not to be written).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a circuit configured to:
   read existing data from a target band including a plurality of data storage areas;
   modify the existing data with other data to create modified data;
   store a portion of the modified data to a nonvolatile memory, the portion being less than all of the modified data; and
   store the modified data to the target band.

2. The apparatus of claim 1 further comprising:
   the data storage areas include data tracks, the target band including:
   a first data track at a first physical end of the target band;
   a second data track adjacent to the first data track;
   a third data track adjacent to the second data track;
   a penultimate data track adjacent to an ultimate data track; and
   the ultimate data track at a second physical end of the target band opposite the first physical end.

3. The apparatus of claim 2 comprising:
   the circuit configured to store the portion of the modified data to the nonvolatile memory including:
   store modified data corresponding to the first data track and the second data track to a scratch pad area of the nonvolatile memory.

4. The apparatus of claim 3 comprising:
   the circuit configured to store the modified data to the target band including:
   storing modified data corresponding to the third data track to the first data track; and
   storing the modified data corresponding to the first data track and the second data track to the penultimate data track and the ultimate data track.

5. The apparatus of claim 4 further comprising:
   the plurality of data tracks are recorded in a shingled manner where one data track partially overlaps an adjacent data track.

6. The apparatus of claim 2 comprising the circuit further configured to:
   receive a write request to store the other data;
   determine a starting track including first physically-located data of the target band to be modified by the other data;
   determine whether the starting track is within a threshold number of tracks of the first data track of the target band;
   read existing data from all tracks of the plurality of data tracks if the starting track is within the threshold;
   when the starting track is not within the threshold,
   read existing data from a number of tracks less than all tracks of the plurality of data tracks, the number of tracks including the starting track; and
   store the portion of modified data to the nonvolatile memory, the portion corresponding to a subset of the number of tracks.

7. The apparatus of claim 6 comprising the circuit further configured to:
   store the modified data to the target band including:
   store modified data corresponding to a fourth track adjacent to tracks from the subset of the number of tracks to a first physical track from the number of tracks; and
   store modified data corresponding to the subset of the number of tracks to the penultimate data track and the ultimate data track.

8. The apparatus of claim 1 further comprising:
   the nonvolatile memory, including the target band; and
   the circuit further configured to store the portion of the modified data to a location of the nonvolatile memory separate from the target band.

9. The apparatus of claim 1 further comprising:
   the plurality of storage areas include physical data sectors; and
   the portion of the modified data corresponds to a selected number of consecutive data sectors.

10. The apparatus of claim 9 further comprising:
    the selected number of consecutive data sectors begins with a first physical data sector of the target band;

the circuit configured to store the modified data to the target band including:
   store first modified data to the first physical sector of the target band, the first modified data corresponding to data from a second physical data sector immediately following a last data sector of the selected number of consecutive data sectors;
   store modified data to consecutive data sectors starting with the first physical data sector until modified data corresponding to data from a last physical data sector of the target band is written; and
   consecutively store the portion of the modified data to data sectors immediately following where the modified data corresponding to data from the last physical data sector was stored.

11. The apparatus of claim 9 further comprising:
the selected number of consecutive data sectors corresponds to at least twice a number of physical sectors in a track of the target band, the track having a maximum number of non-defective physical sectors of all tracks in the target band.

12. A method comprising:
reading existing data from a target band including a plurality of data storage areas of a data storage device;
modifying the existing data with other data to create modified data;
storing a portion of the modified data to a nonvolatile memory, the portion being less than all of the modified data; and
storing the modified data to the target band.

13. The method of claim 12 further comprising:
the data storage areas include data tracks recorded in a shingled manner where one data track partially overlaps an adjacent data track, the target band including:
   a first data track at a first physical end of the target band;
   a second data track adjacent to the first data track;
   a third data track adjacent to the second data track;
   a penultimate data track adjacent to an ultimate data track; and
   the ultimate data track at a second physical end of the target band opposite the first physical end.

14. The method of claim 13 further comprising:
storing the portion of the modified data to the nonvolatile memory including:
   storing modified data corresponding to the first data track and the second data track to a scratch pad area of the nonvolatile memory;
storing the modified data to the target band including:
   storing modified data corresponding to the third data track to the first data track; and
   storing the modified data corresponding to the first data track and the second data track to the penultimate data track and the ultimate data track.

15. The method of claim 13 further comprising:
determining a starting track including first physically-located data of the target band to be modified by the other data;
when the starting track is not the first data track of the target band,
   reading existing data from a number of tracks less than all tracks of the plurality of data tracks, the number of tracks including the starting track;
   storing the portion of modified data to the nonvolatile memory, the portion corresponding to a subset of the number of tracks less than all tracks;
storing the modified data to the target band including:
   storing modified data corresponding to a fourth track adjacent to tracks from the subset of the number of tracks to a first physical track from the number of tracks less than all tracks; and
   storing the portion of modified data to the penultimate data track and the ultimate data track.

16. The method of claim 12 further comprising:
the plurality of storage areas include physical data sectors; and
the portion of modified data corresponds to a selected number of consecutive data sectors.

17. A memory device storing instructions that, when executed, cause a processor to perform a method comprising:
reading existing data from a target band including a plurality of data storage areas of a data storage device;
modifying the existing data with other data to create modified data;
storing a portion of the modified data to a nonvolatile memory, the portion being less than all of the modified data; and
storing the modified data to the target band.

18. The memory device of claim 17, the method further comprising:
the data storage areas include data tracks recorded in a shingled manner where one data track partially overlaps an adjacent data track, the target band including:
   a first data track to be rewritten;
   a second data track adjacent to the first data track;
   a third data track adjacent to the second data track;
   a penultimate data track adjacent to an ultimate data track; and
   the ultimate data track at a physical end of the target band.

19. The memory device of claim 18, the method further comprising:
storing the portion of the modified data to the nonvolatile memory including:
   storing modified data corresponding to the first data track and the second data track to a scratch pad area of the nonvolatile memory, the scratch pad not located within the target band;
storing the modified data to the target band including:
   storing modified data corresponding to the third data track to the first data track; and
   storing the modified data corresponding to the first data track and the second data track to the penultimate data track and the ultimate data track.

20. The memory device of claim 17, the method further comprising:
the plurality of storage areas include physical data sectors, the portion of the modified data corresponding to a selected number of consecutive data sectors beginning with a first physical data sector of the target band;
storing the modified data to the target band including:
   storing first modified data to the first physical sector of the target band, the first modified data corresponding to data from a second physical data sector immediately following a last data sector of the selected number of consecutive data sectors;
   storing modified data to consecutive data sectors starting with the first physical data sector until modified data corresponding to data from a last physical data sector of the target band is written; and
   consecutively storing the portion of modified data to data sectors immediately following where the modified data corresponding to data from the last physical data sector was stored.

\* \* \* \* \*